(12) United States Patent
Sundholm et al.

(10) Patent No.: US 7,143,775 B2
(45) Date of Patent: Dec. 5, 2006

(54) VALVE ELEMENT

(75) Inventors: Goran Sundholm, Tuusula (FI); Harry Metzger, Kerava (FI)

(73) Assignee: Marioff Corporation Oy, Vantaa (FI)

( * ) Notice: Subject to any disclaimer, the term of this patent is extended or adjusted under 35 U.S.C. 154(b) by 251 days.

(21) Appl. No.: 10/497,362

(22) PCT Filed: Jan. 16, 2003

(86) PCT No.: PCT/FI03/00028

§ 371 (c)(1),
(2), (4) Date: Jun. 3, 2004

(87) PCT Pub. No.: WO03/059453

PCT Pub. Date: Jul. 24, 2003

(65) Prior Publication Data

US 2005/0011552 A1   Jan. 20, 2005

(30) Foreign Application Priority Data

Jan. 17, 2002 (FI) .................................. 20020089

(51) Int. Cl.
*F15K 17/40* (2006.01)
*A62C 35/68* (2006.01)
(52) U.S. Cl. ...................... 137/68.3; 137/68.13; 169/11
(58) Field of Classification Search ............. 137/68.13, 137/68.3; 169/11, 28; 222/5
See application file for complete search history.

(56) References Cited

U.S. PATENT DOCUMENTS

| | | | | |
|---|---|---|---|---|
| 1,945,715 A | * | 2/1934 | Wiswell | 137/68.3 |
| 2,025,141 A | * | 12/1935 | Werder | 137/68.3 |
| 2,051,589 A | * | 8/1936 | Allen | 137/68.3 |
| 2,059,189 A | * | 11/1936 | Allen | 137/68.3 |
| 2,149,659 A | * | 3/1939 | Rettis | 137/68.3 |
| 2,441,011 A | * | 5/1948 | Dodelin | 137/68.3 |
| 2,515,068 A | * | 7/1950 | Young | 137/68.3 |
| 2,661,804 A | * | 12/1953 | Haessler | 137/68.13 |
| 2,972,998 A | * | 2/1961 | Detwiler | 137/68.13 |
| 3,633,596 A | * | 1/1972 | Gerber | 137/68.3 |
| 4,006,780 A | | 2/1977 | Zehr | |
| 5,495,865 A | | 3/1996 | Wass et al. | |
| 5,799,735 A | | 9/1998 | Sundholm | |
| 5,857,525 A | | 1/1999 | Okamoto et al. | |
| 6,131,599 A | | 10/2000 | DeGood | |

FOREIGN PATENT DOCUMENTS

DE        2635076 A1     2/1978

* cited by examiner

*Primary Examiner*—John Rivell
(74) *Attorney, Agent, or Firm*—Ladas & Parry LLP

(57) ABSTRACT

Valve element (3, 6, 10), comprising a frame, at least one inlet and at least one outlet, a passage connecting the inlet and outlet, at least one burst disk (13, 35, 63) or equivalent, which, when unbroken, closes the passage from inlet to outlet, and a piston element (15, 36, 65) provided with a piercing element or the like for piercing the burst disk. The piston element (15, 36, 65) is provided with a passage (17, 39, 67) for a pressure medium, said passage extending axially through the piston element from one first side to one second side, which passage leading through the piston forms a part of the passage of the pressure medium after the burst disk (13, 35, 63) has been pierced.

20 Claims, 3 Drawing Sheets

VALVE ELEMENT

BACKGROUND OF THE INVENTION

The present invention relates to a valve element as defined in the preamble of claim 1, which comprises a frame, at least one inlet and at least one outlet, a passage connecting the inlet and outlet and at least one burst disk (rupture disk) or equivalent, which, when unbroken, closes the passage from inlet to outlet, and a piston element provided with a piercing element or the like for piercing the burst disk.

A device corresponding to the subject of the invention is known from specification DE 2635076 A. One of the drawbacks of this solution is that the piercing element is returned by the action of pressure back to its original position, so a piece of the burst disk that may have been detached from it by the piercing action may partially block the passage and thus form an obstacle to the flow of pressure medium. In addition, the piercing element has to go completely through the burst disk in order to produce a hole of the desired size in the disk. If the piercing movement is for some reason incompletely executed, it will not produce a hole of the desired size.

The object of the present invention is to achieve a completely new type of solution that makes it possible to avoid the drawbacks of prior-art devices. The object of the invention is to create a reliable apparatus that can be utilized especially in fire extinguishing applications.

The apparatus of the invention is characterized in that the piston element is provided with a passage for a pressure medium, said passage extending axially through the piston element from one first side to one second side, which passage leading through the piston forms a part of the passage of the pressure medium after the burst disk has been pierced.

The apparatus of the invention is additionally characterized by what is stated in claims 2–7.

The solution of the invention has numerous significant advantages. The passage through the piston ensures that the piston will be effectively pressed towards the burst disk after the disk has been pierced even in cases where a higher pressure prevails on the opposite side of the burst disk than on the side of the piston-piercer combination. The solution of the invention is leak-proof and reliable. By making the channel formed through the piston element a part of the passage for the pressure medium, a passage having a constant diameter in all circumstances is achieved.

BRIEF DESCRIPTION OF THE FIGURES

In the following, the invention will be described in detail by the aid of an example with reference to the attached drawing, wherein.

DETAILED DESCRIPTION OF THE INVENTION

Figure 1:
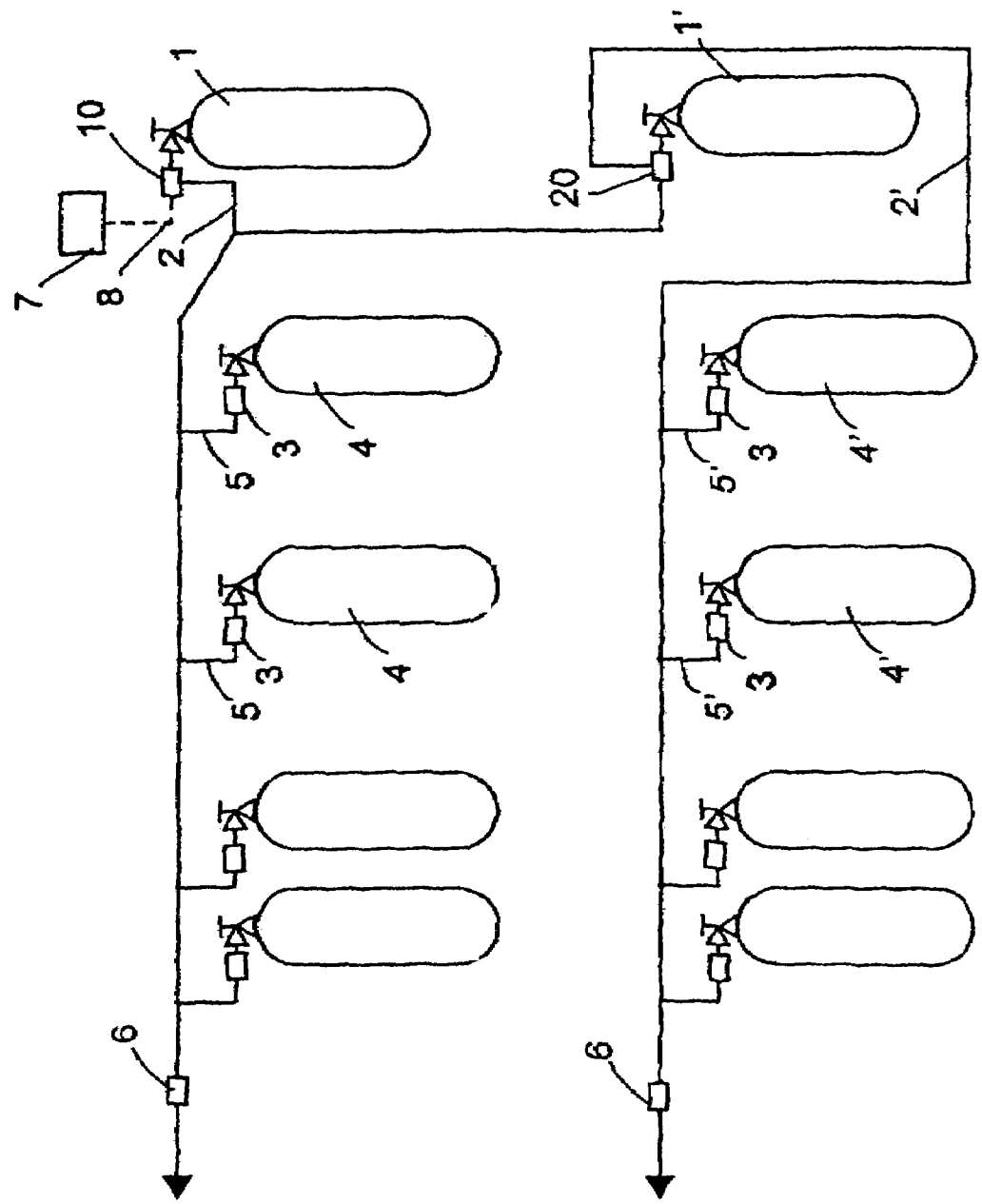
FIG. 1 presents an embodiment of the apparatus of the invention.

FIG. 1 is a diagrammatic representation of a pressure system in which it is possible to utilize valve elements according to the invention. The system comprises at least two parallel-connected pressure sources 4, 4', which in the solution represented by the figure consist of four pressure containers 4, 4' each. In addition, the system comprises at least one first pressure source 1 and means for opening a connecting passage from the first pressure source 1 to a pressure network 2, which communicates with a first pressure source 4. The means for opening a connecting passage comprise a first valve element 10, which is disposed between the first pressure source 1 and the pressure network 2. When the first valve element 10 is opened, e.g. triggered by a control system 7 or manually, the pressure in the network 2 rises. This has the effect of opening second valve elements 3, which are disposed at least in the passage 5 between the first pressure source 4 and the network 2. After the pressure in the network 2 has risen to a sufficient level, a third valve element 6 will be opened at a pre-set pressure.

As the pressure In the network 2 is rising, a passage is opened from a second pressure source 1' to a fourth valve element 20. This keeps the connection to the second branch 2' of the pressure network closed until the pressure in the first pressure network 2 has fallen to a predetermined value. After this, the pressure in the second network 2' rises, with the result that valve elements 3 connected to at least one second pressure source 4' open a passage 5' into the second pressure network 2'. The third valve element 6 is not opened until the pressure in the second pressure network 2' has reached a predetermined value.

Figure 2:
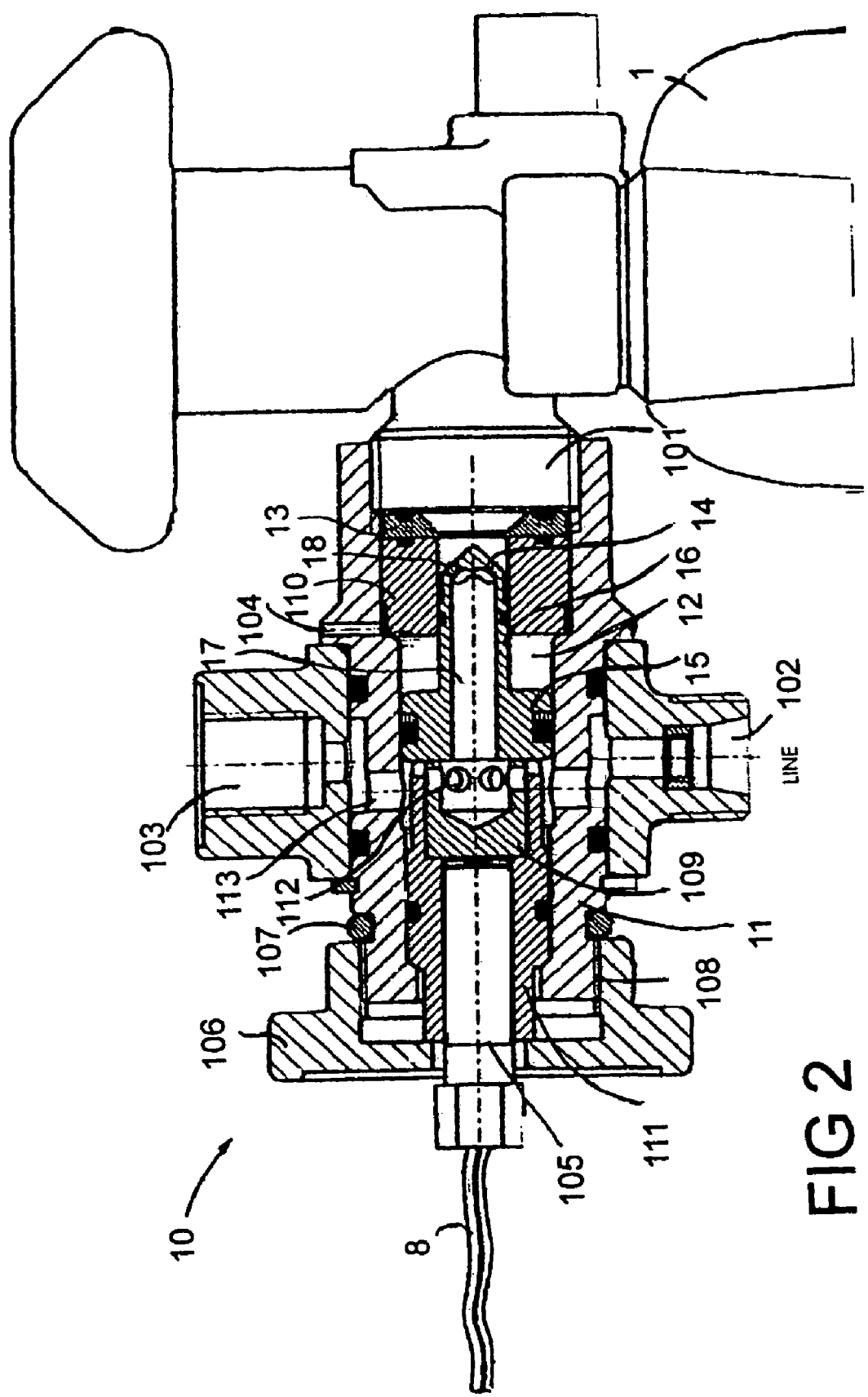
FIG. 2 presents a valve element according to the invention.
Figure 3:
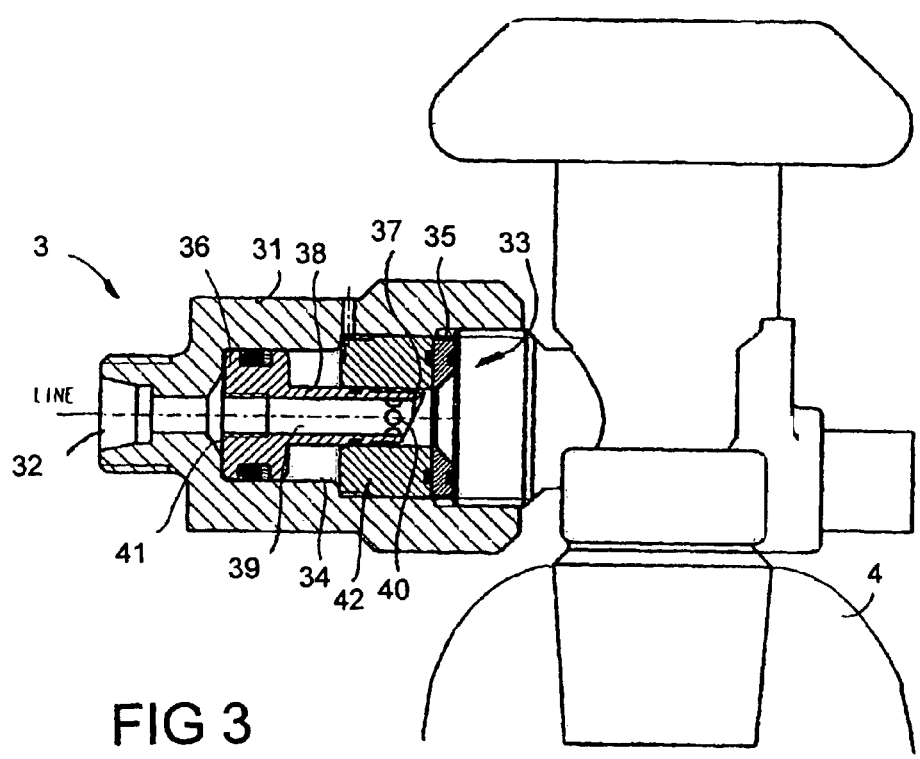
FIG. 3 presents another valve element according to the invention.

A more detailed view of the first valve element 10 is presented in FIG. 2. The device comprises a frame 11 which has an inlet connectable to a pressure source and an outlet connectable to an outgoing line. Provided between the inlet and the outlet is a burst disk 13 (rupture disk) which, when unbroken, closes the passage from the inlet to the outlet. The device also comprises means for piercing the burst disk 13. These means consist of a cylinder-piston combination in which the piston 15 comprises a piercing element 14 formed on it, preferably on the side of the piston rod 16. The piston 15 has been arranged to be movable within a cylinder space 12 between a fist position, where the piercing element 14 formed on the piston rod 16 is on the outlet side in relation to the burst disk 13, and a second position, where the piercing element extends at least partially to the inlet side in relation to the burst disk 13. The piston is provided with at least one bore 17 extending through the piston 15, preferably from the piercing element 14 to the opposite side of the piston 15 so that, after the burst disk 13 has been pierced, a passage is formed from the inlet side to the outlet side. Formed at or near the tip of the piercing element is at least one aperture 18 extending into the bore 17, thus forming a part of the passage for the pressure medium after the burst disk 13 has been pierced. The cylinder space is preferably provided with a sleeve part 110 which has an opening extending in the axial direction of the piston, the piston rod being substantially sealedly fitted to move in the opening. The burst disk 13 is sealedly fitted against the sleeve 110 and tightened by means of an inlet coupling 101. Furthermore, the device comprises actuating means for actuating the piston-piercer combination. The embodiment illustrated in FIG. 2 is provided with both a manual actuating element and an automatic actuating element. The manual solution comprises a handwheel 106, which, after removal of a cotter 107, can be turned to move it axially towards the piston 15 according to the pitch of the thread 108. The axial movement is transmitted by a spacer 111 to the surface of the piston 15 facing in the opposite direction relative to the piercing element, thus causing the piercer to move towards the burst disk 13. Once the handwheel has been rotated sufficiently, the tip of the piercer will pierce the burst disk, thus allowing the pressure medium to flow through the apertures 18 and the bore 17 to the outlet side. The pressure medium is now admitted to the outlet 102 side of the piston 15, where the piston surface is larger than the cross-sectional area of the piston rod, with the result that the piston 15 is moved by the action of the pressure towards the burst disk until it is stopped by the sleeve 110. Thus, even a small hole in the burst disk 13 is sufficient to cause the piercer 14 to penetrate the burst disk through an area corresponding to the cross-section of the piercer.

A second actuating element is designed for remote control, whereby the valve element is to be triggered by means of a control signal. The control signal is supplied via transmission means 8, such as conductors, typically from a control system. The control signal causes the piston of the actuating element to move towards piston 15. In a preferred case, the valve element comprises a connecting piece 109 placed between the actuating element 105 and the piston 15 and provided with bores 112 or similar relief holes to allow easier passage of the pressure medium from the channel 17 through the cylinder space 12 and channel 113 to the outlet. The actuating element 105 is preferably an electrically operated device in which a control current detonates an explosive charge in the actuating element, thus causing the piston of the actuating element to be vigorously thrust out. The actuating element can be connected to a control system, so the device can be used e.g. in connection with fire extinguishing equipment so that the impulse triggering the actuating element 105 is received from fire detectors and/or smoke detectors (not shown).

In the embodiment presented In the figure, the valve element 10 also comprises a second outlet 103 especially for venting purposes. To this second outlet it is possible to connect e.g. a valve element (not shown) which, when the valve element is in a state of readiness, vents any leakage pressure but Is closed at high pressures.

There is also a second venting channel 104 leading out from the cylinder space 12 to ensure that the piston will be able to move towards the burst disk without being obstructed by the pressure medium between the piston and the burst disk, because the pressure medium can be let out of the space via the second venting channel 104.

Thus, the first valve element 10 is preferably a triggering valve used to trigger a pressure medium system.

After the triggering of the first valve element 10, pressure is admitted via the outlet into the first line 2. The pressure in the line therefore rises, and the second valve elements 3 open a passage from the pressure source 4 into the first line 2. The second valve elements 3 comprise a frame 31, a first connection 32 to line 5, a second connection 33 to the pressure source, a cylinder chamber 34 and a burst disk 35, which is so arranged that, while unbroken, it closes the passage between the first and the second connections. The device also comprises means for piercing the burst disk 35. These means consist of a cylinder-piston combination in which the piston 36 comprises a piercing element 37 formed on it, preferably on the side of the piston rod 38. The piston 36 has been arranged to be movable in the cylinder space 34 between a fist position, where the piercing element 37 formed on the piston rod 38 is on the side of the first connection 32 in relation to the burst disk 35, and a second position, where the piercing element 37 extends at least partially to the side of the second connection 33 in relation to the burst disk 35. The piston is provided with at least one bore 39 extending through the piston, preferably from the piercing element 37 to the opposite side of the piston so that, after the burst disk 35 has been pierced, a passage is formed from the side of the second connection to the side of the first connection. Formed at or near the tip of the piercing element is at least one aperture 40 extending into the bore 39, thus forming a part of the passage for the pressure medium after the burst disk 35 has been pierced, or at least facilitating the admission of the pressure medium into the bore 39. As the pressure in the line is increasing, the piston element moves towards the burst disk and the tip of the piercing element penetrates the burst disk. The pressure medium from the pressure source 4 can propagate via the second connection and through the passage formed by the hole made in the burst disk and the bore in the piston element out via the first connection and line 5 into line 2. The pressure medium is now admitted to the side of the piston 36 facing towards the first connection, where the piston surface 41 is larger than the cross-sectional area of the piston rod, with the result that the piston 36 is moved by the action of the pressure towards the burst disk 35 until it is stopped by the sleeve 42. Thus, even a small hole in the burst disk 35 is sufficient to cause the piercing element 37 to penetrate the burst disk through an area corresponding to the cross-section of the piercer. The burst disk and the piercing element and the forces applied to them are so adapted in relation to each other that the burst disk will be at least partially pierced by the piercing element at a desired pressure. Thus, the second valve element 3 is preferably a closing valve of the second pressure source, being opened by a pressure impulse received from the first pressure source.

Figure 4:
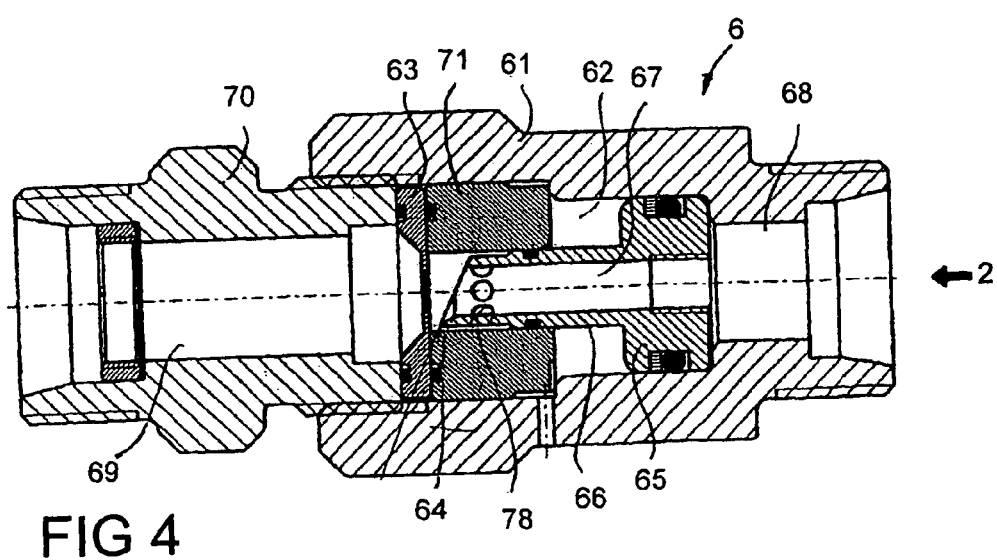
FIG. 4 presents a third valve element according to the invention.

To raise the pressure in line 2 to a sufficient level, it can be provided with a third valve element 6. This valve element is also provided with a burst disk designed to be pierced, preferably by means of a piston-piercer combination, after the pressure on the inlet side has risen to a sufficient level. The device comprises a frame 61 and a cylinder space 62 with an inlet 68 from line 2 and an outlet 69. Disposed between the inlet and the outlet is at least one burst disk 63 which, when unbroken, closes the passage between the inlet and the outlet. Fitted in the cylinder space is a piston element 65 on the inlet side of the burst disk, the piston element being provided with a piercing element 64 preferably formed on the piston rod 66. In the embodiment illustrated in FIG. 4, the burst disk 63 is sealedly fitted between a coupling part 70 designed to connect the valve element to the line 2 and a sleeve 71 provided in the frame. When the pressure on the inlet side reaches a predetermined value, the piercing element with at least one aperture 78 will pierce the burst disk, thus opening a passage from the inlet side to the outlet side, preferably through a bore 67 formed in the piston.

In all the above-described embodiments, the piston rod 16, 38, 66 of the piston element is sealedly fitted against the wall of the cylinder space, so that the pressure medium can typically only flow via the passage provided through the piston.

The burst disk is preferably designed to withstand high pressures and pressure differences. The active pressures are typically over 30 bar, preferably over 70 bar. The pressures may even be as high as 300 bar. The burst disk preferably comprises a thinner part in the area to which the action of the piercing element is applied In the triggering situation.

Valve elements according to the invention can be applied especially in connection with fire extinguishing systems, especially in connection with a fire extinguishing apparatus using high-pressure water mist. The pressure medium may consist of gas, liquid or a mixture of gas and liquid.

It is obvious to the person skilled In the art that the invention is not limited to the embodiments described above, but that it may be varied within the scope of the claims presented below.

The invention claimed is:

1. In a valve element (3, 6, 10) having a frame, at least one inlet and at least one outlet, a passage connecting the inlet and outlet, at least one burst or rupture disk (13, 35, 63) which, when unbroken, closes the first passage connecting the inlet and outlet, and a piston element (15, 36, 65) provided with a piercing element for piercing the burst or rupture disk, the improvements in that:
- a piston rod (16, 38, 66) of the piston element is sealedly fitted to a wall of a cylinder space for the piston element;
- the piston element (15, 36, 65) is provided with a passage portion (17, 39, 67) the passage portion extending axially through the piston element and forming a part of the passage only after the burst or rupture disk (13, 35, 63) has been pierced; and
- a cross section of the piston rod is smaller than a piston surface of the piston element.

2. Valve element according to claim 1, characterized in that the piercing element (14, 37, 64) is provided with at least one aperture (18, 40, 68) extending from an outer surface of the piston element to the passage portion (17, 39, 67).

3. Valve element according to claim 1, further comprising means (105, 106) for actuating the piston element.

4. Valve element according to claim 1, characterized in that the valve element additionally comprises a manual (106) and/or an automatic (105) means for actuating the piston element.

5. Valve element according to claim 1, characterized in that the valve element (10) is a triggering valve for the triggering of a pressure medium system.

6. Valve element according to claim 1, characterized in that the valve element (3) is the closing valve of a second pressure source and that it is opened by a pressure impulse received from a first pressure source.

7. Valve element according to claim 2, further comprising means (105, 106) for actuating the piston element.

8. Valve element according to claim 7, characterized in that the valve element additionally comprises a manual (106) and/or an automatic (105) means for actuating the piston element.

9. Valve element according to claim 7, characterized in that the valve element (10) is a triggering valve for the triggering of a pressure medium system.

10. Valve element according to claim 7, characterized in that the valve element (3) is the closing valve of a second pressure source and that it is opened by a pressure impulse received from a first pressure source.

11. Valve element according to claim 2, characterized in that the valve element additionally comprises a manual (106) and/or an automatic (105) means for actuating the piston element.

12. Valve element according to claim 11, characterized in that the valve element (10) is a triggering valve for the triggering of a pressure medium system.

13. Valve element according to claim 11, characterized in that the valve element (3) is the closing valve of a second pressure source and that it is opened by a pressure impulse received from a first pressure source.

14. Valve element according to claim 3, characterized in that the valve element additionally comprises a manual (106) and/or an automatic (105) means for actuating the piston element.

15. Valve element according to claim 14, characterized in that the valve element (10) is a triggering valve for the triggering of a pressure medium system.

16. Valve element according to claim 14, characterized in that the valve element (3) is the closing valve of a second pressure source and that it is opened by a pressure impulse received from a first pressure source.

17. Valve element according to claim 2, characterized in that the valve element (10) is a triggering valve for the triggering of a pressure medium system.

18. Valve element according to claim 3, characterized in that the valve element (10) is a triggering valve for the triggering of a pressure medium system.

19. Valve element according to claim 4, characterized in that the valve element (10) is a triggering valve for the triggering of a pressure medium system.

20. Valve element according to claim 2, characterized in that the valve element (3) is the closing valve of a second pressure source and that it is opened by a pressure impulse received from a first pressure source.

* * * * *